United States Patent
Shi

(10) Patent No.: US 12,491,843 B2
(45) Date of Patent: Dec. 9, 2025

(54) SWINGING SPRAY DEVICE WITH NOVEL STRUCTURE

(71) Applicant: Zhejiang Yigoli Intelligent Technology Co., Ltd., Hangzhou (CN)

(72) Inventor: Hengzhi Shi, Hangzhou (CN)

(73) Assignee: Zhejiang Yigoli Intelligent Technology Co., Ltd., Hangzhou (CN)

( * ) Notice: Subject to any disclaimer, the term of this patent is extended or adjusted under 35 U.S.C. 154(b) by 162 days.

(21) Appl. No.: 18/500,309

(22) Filed: Nov. 2, 2023

(65) Prior Publication Data
US 2024/0059256 A1    Feb. 22, 2024

(30) Foreign Application Priority Data
Feb. 14, 2023    (CN) .......................... 202320330957.7

(51) Int. Cl.
*B60S 3/04*    (2006.01)
*B08B 3/02*    (2006.01)

(52) U.S. Cl.
CPC ................ *B60S 3/04* (2013.01); *B08B 3/024* (2013.01)

(58) Field of Classification Search
None
See application file for complete search history.

(56) References Cited

U.S. PATENT DOCUMENTS

| | | | |
|---|---|---|---|
| 5,255,695 A * | 10/1993 | Downey | .................. B60S 3/04 |
| | | | 134/123 |
| 2009/0314859 A1 | 12/2009 | Causby et al. | |
| 2014/0291415 A1 | 10/2014 | Gill et al. | |
| 2019/0344296 A1 | 11/2019 | Chen | |

* cited by examiner

*Primary Examiner* — Rita P Adhlakha
(74) *Attorney, Agent, or Firm* — Zhigang Ma

(57) ABSTRACT

The present disclosure relates to a swinging spray device with a novel structure. The swinging spray device includes nozzles for swinging spray washing on a top and two sides of a vehicle; a reduction motor, mounted on a car washing machine and used for driving each nozzle to swing; a short connecting rod with one end in driving connection with the reduction motor through a rotating arm and the other end rotatably connected to a cross connecting rod and an upper swing arm respectively, where the other end of the upper swing arm is connected to the nozzle, and the upper swing arm is mounted on the car washing machine through a swing assembly.

11 Claims, 5 Drawing Sheets

SWINGING SPRAY DEVICE WITH NOVEL STRUCTURE

BACKGROUND OF THE PRESENT DISCLOSURE

Technical Field

The present disclosure relates to the technical field of car washing machines, and in particular, to a swinging spray device with a novel structure.

Description of Related Art

A standard configuration on an existing car washing machine is a swinging spray device, which is usually supported by a spray frame composed of a spray beam and columns. Nozzles and a mechanism for driving the nozzles are mounted on the spray frame, and each swing shaft is fixed at two ends by vertical belt bearing seats. The vertical belt bearing seats are excessive, need to be accurately mounted to ensure correct operation, and are prone to wear under a lot of axial load and susceptible to damage by vibration. As a result, the car washing machine is prone to malfunctions and requires frequent maintenance.

Therefore, a significantly simplified swinging spray device without vertical belt bearing seats is urgently needed to solve the problems existing in the prior art.

SUMMARY OF THE PRESENT DISCLOSURE

An objective of the present disclosure is to provide a swinging spray device with a novel structure in response to the above problems existing in the prior art.

In order to achieve the above objective, the present disclosure employs the following technical solution: A swinging spray device with a novel structure includes:

nozzles for swinging spray washing on a top and two sides of a vehicle;

a reduction motor, mounted on a car washing machine and used for driving each nozzle to swing;

a short connecting rod with one end in driving connection with the reduction motor through a rotating arm and the other end rotatably connected to a cross connecting rod and an upper swing arm respectively, where the other end of the upper swing arm is connected to the nozzle, and the upper swing arm is mounted on the car washing machine through a swing assembly;

the cross connecting rod with one end rotatably connected to the short connecting rod and the upper swing arm simultaneously and the other end connected to a top end of a vertical connecting rod through a middle swing arm, where the middle swing arm is mounted on the car washing machine through a swing assembly; and the vertical connecting rod with a bottom end connected to the nozzle through a lower swing arm, where the lower swing arm is mounted on the car washing machine through a swing assembly.

Working principle and beneficial effects are as follows: 1. Compared with the prior art, the present disclosure employs the swing assembly to mount each middle swing arm and upper swing arm, and neither large spray brackets nor vertical bearing seats are required to mount the nozzles and each swing arm, thereby simplifying the structure, reducing costs, reducing malfunctions to a certain extent in the absence of vertical bearing seats, and making the device more stable and reliable; and 2. The present disclosure employs the reduction motor to drive each nozzle to swing, so that the spraying effect is more uniform; and a linkage mechanism among the short connecting rod, the cross connecting rod, and the vertical connecting rod ensures that the swinging is more stable, the spraying is more accurate, the entire structure is simple and easy to operate, and maintenance and replacement are facilitated.

Further, the nozzles include a first nozzle located in a middle position of a top of the swinging spray device and second nozzles located on two sides of a bottom of the swinging spray device, and the two second nozzles are symmetrically arranged. The present disclosure can implement the swinging spray washing on the top and two sides of the vehicle to effectively improve car washing efficiency.

Further, the first nozzle is connected to the upper swing arm through a top swing pipe, and the top swing pipe is rotatably connected to the swing assembly.

Further, the second nozzle is connected to the lower swing arm through a side swing pipe, and the side swing pipe is rotatably connected to the swing assembly.

Further, both the top swing pipe and the side swing pipe are connected to a high-pressure water pipe through rotary joints to supply water to the nozzles. Water can be supplied without affecting rotation of the swing pipes.

Further, the rotating arm is rotatably connected to the short connecting rod through a fisheye joint, and the other end of the short connecting rod is also rotatably connected to the upper swing arm through a fisheye joint. The fisheye joint, also known as a rod end joint bearing, has the advantages of simple bearing installation, compact structure, high load capacity, good friction resistance, good sealing performance, convenient maintenance, and the like, and can easily connect the rotating arm and the short connecting rod, as well as the short connecting rod and the upper swing arm.

Further, one end of the cross connecting rod is rotatably connected to the upper swing arm through a fisheye joint, and the other end is also rotatably connected to the middle swing arm through a fisheye joint. The upper swing arm and the cross connecting rod, as well as the cross connecting rod and the middle swing arm can be easily connected.

Further, the top end of the vertical connecting rod is rotatably connected to the middle swing arm through a fisheye joint, and a bottom end is also rotatably connected to the lower swing arm through a fisheye joint. The vertical connecting rod and the middle swing arm, as well as the middle swing arm and the lower swing arm can be easily connected.

Further, both the reduction motor and the swing assembly are fixed on the car washing machine through connectors. The installation is convenient.

Further, each swing assembly is provided with at least one mounting flange surface, which is fixed on the car washing machine through a connector. The installation is convenient.

Figure 1:
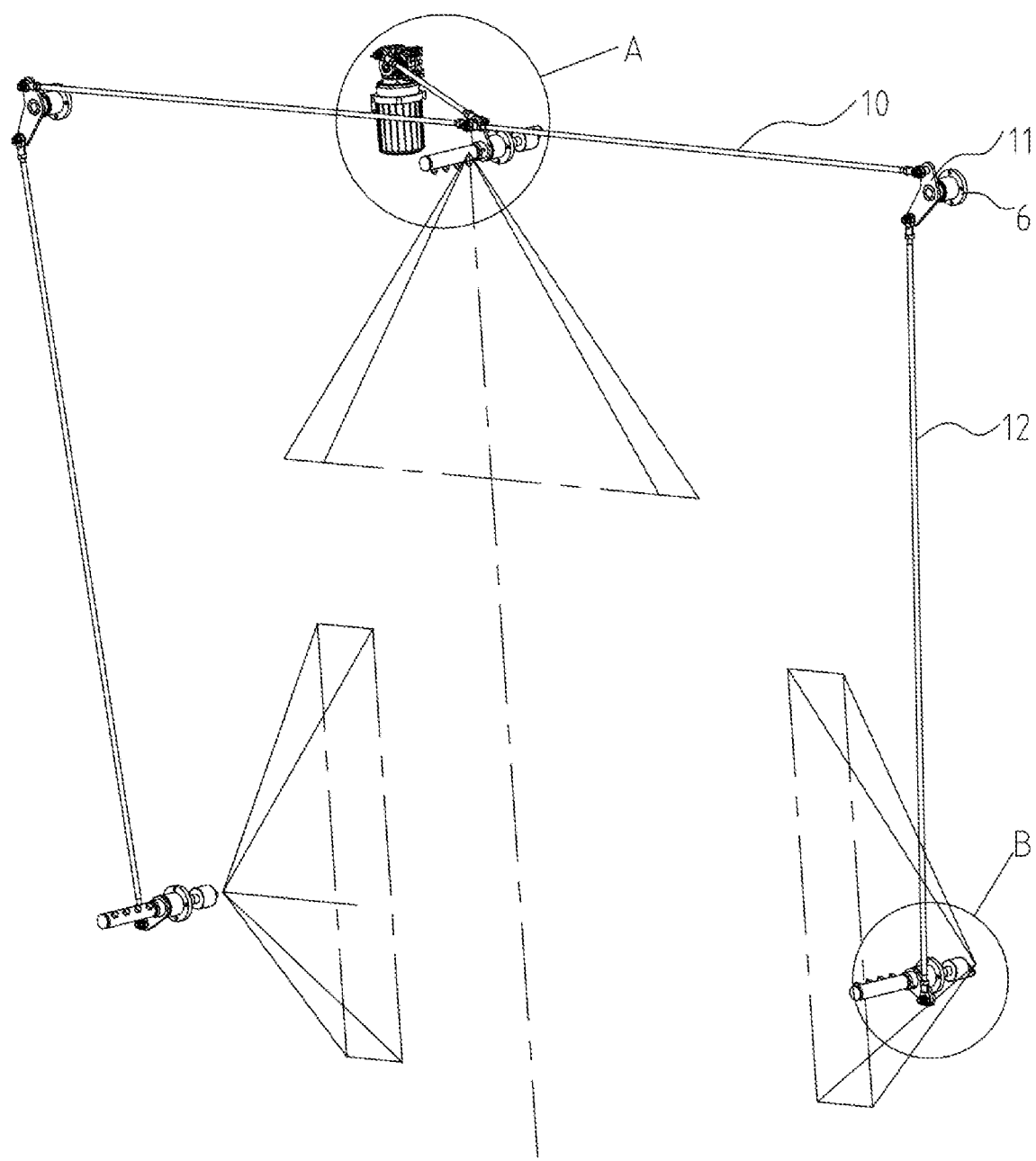
FIG. 1 is a schematic structural illustration of the present disclosure.
Figure 2:
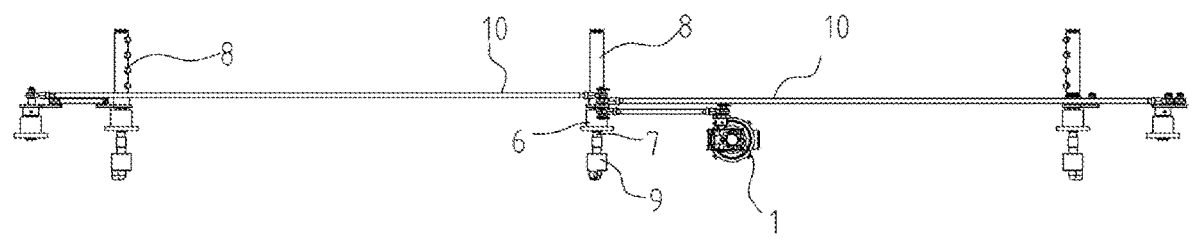
FIG. 2 is a top view of the present disclosure.
Figure 3:
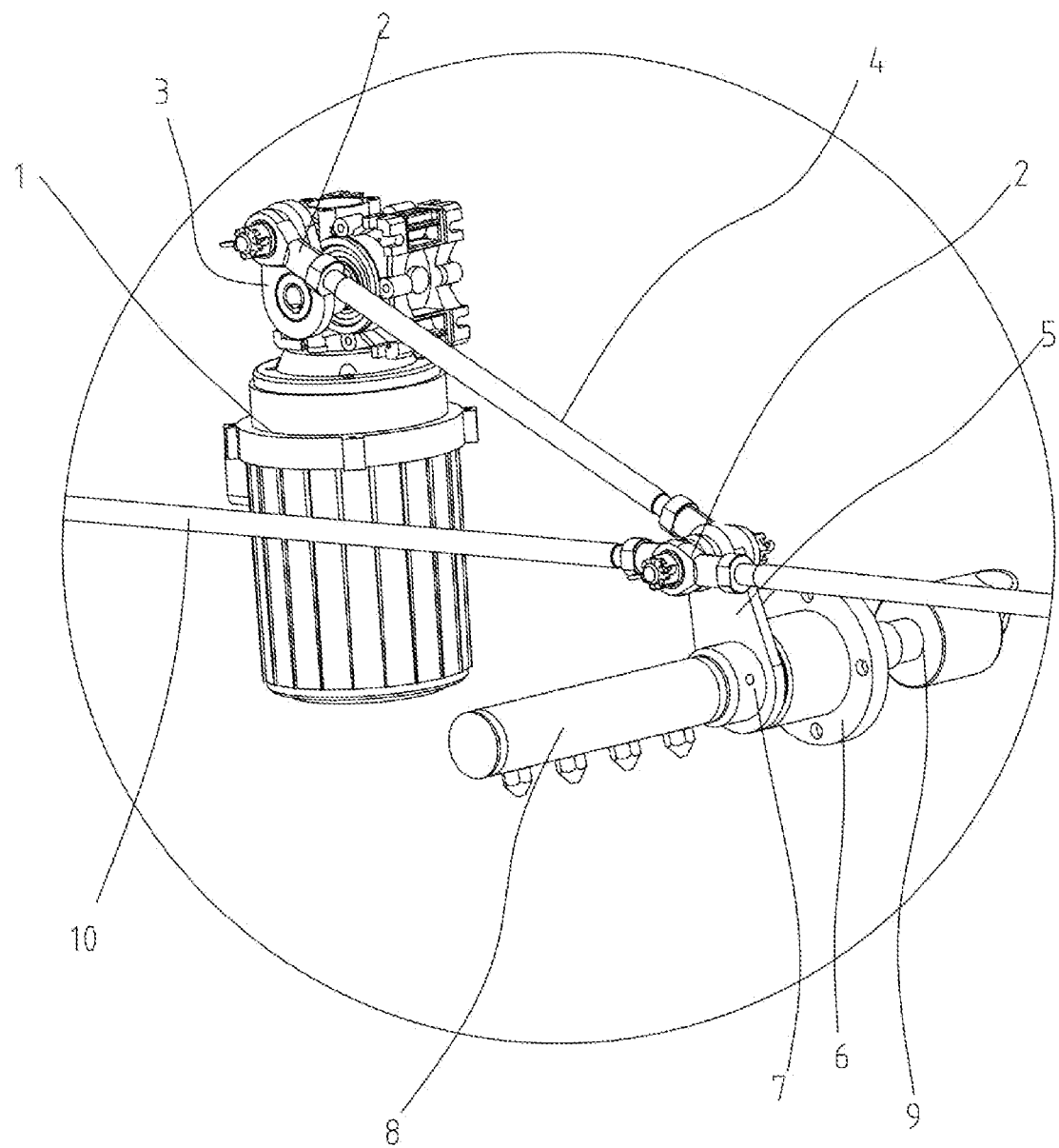
FIG. 3 is an enlarged view of A in FIG. 1.
Figure 4:
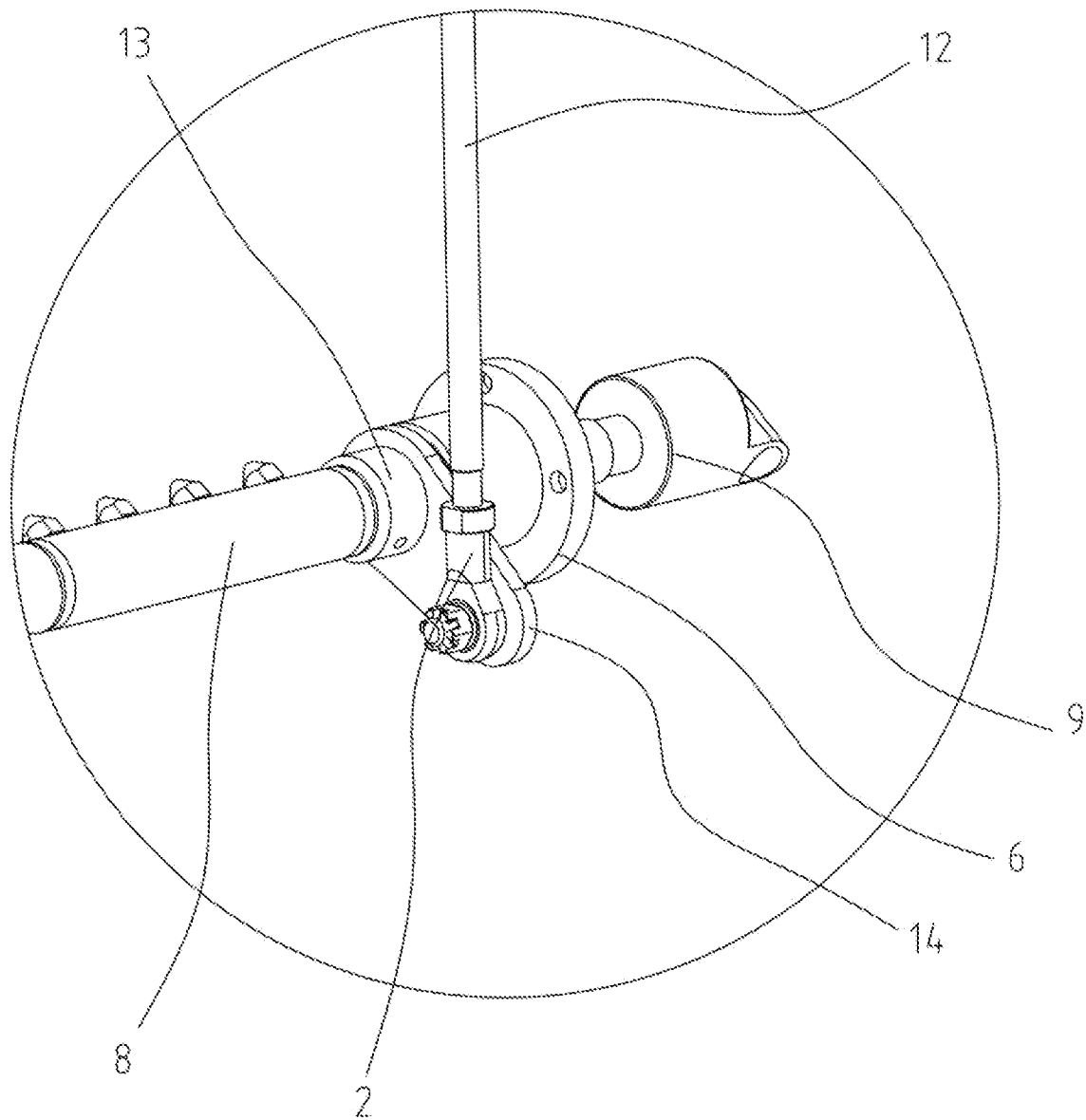
FIG. 4 is an enlarged view of B in FIG. 1.

In the figures, 1. Reduction motor; 2. Fisheye joint; 3. Rotating arm; 4. Short connecting rod; 5. Upper swing arm; 6. Swing assembly; 7. Top swing pipe; 8. Nozzle; 9. Rotary joint; 10. Cross connecting rod; 11. Middle swing arm; 12.

Vertical connecting rod; 13. Side swing pipe; 14. Lower swing arm; 15. Vertical bearing seat; 16. Spray beam; 17. Spray column.

DETAILED DESCRIPTION OF THE PREFERRED EMBODIMENT

Technical solutions in embodiments of the present disclosure will be clearly and completely described below with reference to the accompanying drawings in the embodiments of the present disclosure. Apparently, the described embodiments are merely some, but not all of the embodiments of the present disclosure. All other embodiments obtained by those of ordinary skill in the art based on the embodiments in the present disclosure fall within the protection scope of the present disclosure.

Those skilled in the art should understand that, in the present disclosure, the orientations or positional relationships indicated by the terms "longitudinal", "lateral", "upper", "lower", "front", "rear", "left", "right", "vertical", "horizontal", "top", "bottom", "inner", "outer", and the like are based on the orientations or positional relationships shown in the accompanying drawings, and are intended to facilitate the description of the present disclosure and simplify the description only, rather than indicating or implying that an apparatus or element referred to must have a particular orientation or be constructed and operated in a particular orientation, and therefore, these terms cannot be interpreted as limiting the present disclosure.

As shown in FIGS. 1-4, a swinging spray device with a novel structure includes:

Nozzles 8 for swinging spray washing on a top and two sides of a vehicle;

In this embodiment, the nozzles 8 include a first nozzle 8 located in a middle position of a top of the swinging spray device and second nozzles 8 located on two sides of a bottom of the swinging spray device, and the two second nozzles 8 are symmetrically arranged. The nozzles can implement the swinging spray washing on the top and two sides of the vehicle to effectively improve car washing efficiency.

Preferably, the first nozzle 8 is connected to an upper swing arm 5 through a top swing pipe 7, the top swing pipe 7 is rotatably connected to a swing assembly 6, the second nozzle 8 is connected to a lower swing arm 14 through a side swing pipe 13, the side swing pipe 13 is rotatably connected to a swing assembly 6, and both the top swing pipe 7 and the side swing pipe 13 are connected to a high-pressure water pipe through rotary joints 9 to supply water to the nozzles 8. Water can be supplied without affecting rotation of the swing pipes.

Figure 5:
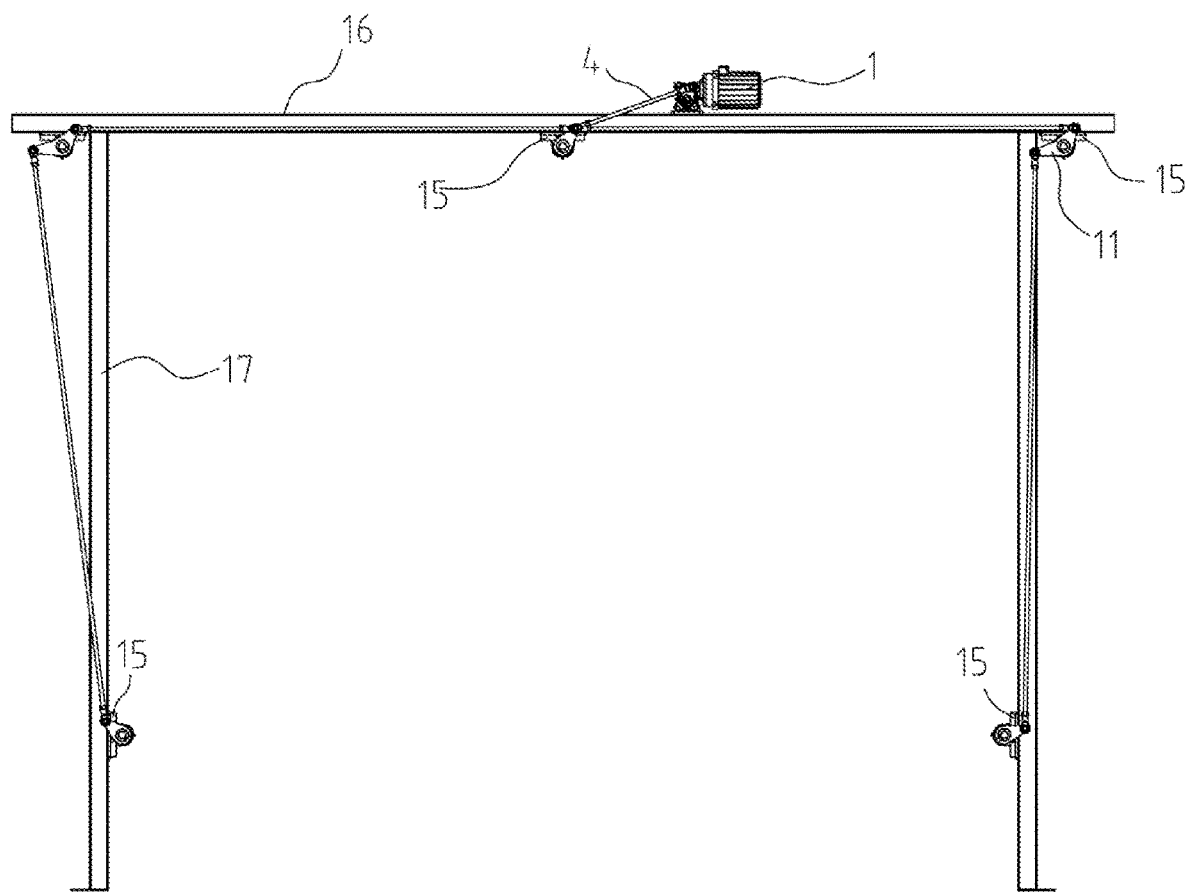
FIG. 5 is a schematic structural illustration of the prior art.

A reduction motor 1, mounted on a car washing machine and used for driving each nozzle 8 to swing;

This embodiment differs from the prior art in which the reduction motor is mounted on a spray beam 16 as shown in FIG. 5, while the reduction motor 1 is directly mounted on the car washing machine in the present disclosure, without the spray beam 16.

A short connecting rod 4 with one end in driving connection with the reduction motor 1 through a rotating arm 3 and the other end rotatably connected to a cross connecting rod 10 and the upper swing arm 5 respectively, where the other end of the upper swing arm 5 is connected to the nozzle 8, and the upper swing arm is mounted on the car washing machine through the swing assembly 6;

The cross connecting rod 10 with one end rotatably connected to the short connecting rod 4 and the upper swing arm 5 simultaneously and the other end connected to a top end of a vertical connecting rod 12 through a middle swing arm 11, where the middle swing arm 11 is mounted on the car washing machine through the swing assembly 6; and The vertical connecting rod 12 with a bottom end connected to the nozzle 8 through the lower swing arm 14, where the lower swing arm 14 is mounted on the car washing machine through the swing assembly 6.

Preferably, the rotating arm 3 is rotatably connected to the short connecting rod 4 through a fisheye joint 2, and the other end of the short connecting rod 4 is also rotatably connected to the upper swing arm 5 through a fisheye joint 2; one end of the cross connecting rod 10 is rotatably connected to the upper swing arm 5 through a fisheye joint 2, and the other end is also rotatably connected to the middle swing arm 11 through a fisheye joint 2; and the top end of the vertical connecting rod 12 is rotatably connected to the middle swing arm 11 a the fisheye joint 2, and a bottom end is also rotatably connected to the lower swing arm 14 through a fisheye joint 2. The fisheye joint 2, also known as a rod end joint bearing, has the advantages of simple bearing installation, compact structure, high load capacity, good friction resistance, good sealing performance, convenient maintenance, and the like, and can easily implement connection.

Preferably, each swing assembly 6 is provided with at least one mounting flange surface, which is fixed on the car washing machine through a bolt, a lock nut, or the like.

The unspecified parts of the present disclosure are the prior art, and therefore, are not detailed in the present disclosure.

It can be understood that the term "a" should be understood as "at least one" or "one or more", that is, in one embodiment, the number of an element may be one, and in another embodiment, the number of the element may be more than one, so the term "a" cannot be understood as a restriction on the number.

Although many terms such as reduction motor 1, fisheye joint 2, rotating arm 3, short connecting rod 4, upper swing arm 5, swing assembly 6, top swing pipe 7, nozzle 8, rotary joint 9, cross connecting rod 10, middle swing arm 11, vertical connecting rod 12, side swing pipe 13, lower swing arm 14, vertical bearing seat 15, spray beam 16, and spray column 17 are used herein, other terms are not excluded. These terms are used only for describing and explaining the essence of the present disclosure more conveniently. Interpreting the terms as any additional restrictions is contrary to the spirit of the present disclosure.

The present disclosure is not limited to the foregoing best embodiments. Any person can derive other products in various forms under the enlightenment of the present disclosure. However, regardless of any change in shape or structure, all other technical solutions that are the same as or similar to the technical solutions of the present disclosure fall within the protection scope of the present disclosure.

What is claimed is:

1. A swinging spray device, used for a car washing machine, comprising:
    nozzles for swinging spray washing on a top and two sides of a vehicle;
    a reduction motor, mounted on a car washing machine and used for driving each nozzle to swing;
    a first connecting rod with one end in driving connection with the reduction motor through a rotating arm and the other end rotatably connected to a cross connecting rod and an upper swing arm respectively, with the first connecting rod being shorter than the cross connecting rod, wherein the other end of the upper swing arm is connected to one of the nozzles, and the upper swing arm is mounted on the car washing machine through a first swing assembly;

the cross connecting rod with one end rotatably connected to the first connecting rod and the upper swing arm simultaneously and the other end connected to a top end of a vertical connecting rod through a middle swing arm, wherein the middle swing arm is mounted on the car washing machine through a second swing assembly; and the vertical connecting rod with a bottom end connected to one of the nozzles through a lower swing arm, wherein the lower swing arm is mounted on the car washing machine through a third swing assembly.

2. The swinging spray device according to claim 1, wherein the nozzles comprise a first nozzle located in a middle position of a top of the swinging spray device and second nozzles located on two sides of a bottom of the swinging spray device, and the two second nozzles are symmetrically arranged.

3. The swinging spray device according to claim 2, wherein the first nozzle is connected to the upper swing arm through a top swing pipe, and the top swing pipe is rotatably connected to the first swing assembly.

4. The swinging spray device according to claim 3, wherein the second nozzle is connected to the lower swing arm through a side swing pipe, and the side swing pipe is rotatably connected to the third swing assembly.

5. The swinging spray device according to claim 4, wherein both the top swing pipe and the side swing pipe are connected to a high-pressure water pipe through rotary joints to supply water to the nozzles.

6. The swinging spray device according to claim 1, wherein the rotating arm is rotatably connected to the first connecting rod through a fisheye joint, and the other end of the first connecting rod is also rotatably connected to the upper swing arm through a fisheye joint.

7. The swinging spray device according to claim 1, wherein one end of the cross connecting rod is rotatably connected to the upper swing arm through a fisheye joint, and the other end is also rotatably connected to the middle swing arm through a fisheye joint.

8. The swinging spray device according to claim 1, wherein the top end of the vertical connecting rod is rotatably connected to the middle swing arm through a fisheye joint, and a bottom end is also rotatably connected to the lower swing arm through a fisheye joint.

9. The swinging spray device according to any one of claims 1-8, wherein the reduction motor and the first swing assembly, the second swing assembly and the third swing assembly are fixed on the car washing machine through connectors.

10. The swinging spray device according to any one of claims 1-8, wherein each swing assembly is provided with at least one mounting flange surface, which is fixed on the car washing machine through a connector.

11. A swinging spray device, used for a car washing machine, comprising:

nozzles for swinging spray washing on a top and two sides of a vehicle;

a reduction motor, mounted on a car washing machine and used for driving each nozzle to swing;

a first connecting rod with one end in driving connection with the reduction motor through a rotating arm and the other end rotatably connected to two cross connecting rods and an upper swing arm respectively, with the first connecting rod being shorter than each of the cross connecting rods, and the cross connecting rods arranged on two sides of the other end of the first connecting rod, wherein the other end of the upper swing arm is connected to one of the nozzles, and the upper swing arm is mounted on the car washing machine through a first swing assembly;

each of the cross connecting rods with one end rotatably connected to the first connecting rod and the upper swing arm simultaneously and the other end connected to a top end of a vertical connecting rod through a middle swing arm, wherein the middle swing arm is mounted on the car washing machine through a second swing assembly; and the vertical connecting rod with a bottom end connected to one of the nozzles through a lower swing arm, wherein the lower swing arm is mounted on the car washing machine through a third swing assembly.

\* \* \* \* \*